United States Patent [19]
Hemena et al.

[11] Patent Number: 6,160,386
[45] Date of Patent: Dec. 12, 2000

[54] PARALLEL POWER SYSTEM WHICH INCLUDES OVER VOLTAGE PROTECTION

[75] Inventors: William Hemena, Raleigh; Randhir Malik, Cary, both of N.C.

[73] Assignee: International Business Machines Corporation, Armonk, N.Y.

[21] Appl. No.: 09/426,286

[22] Filed: Oct. 25, 1999

[51] Int. Cl.$^7$ ....................................................... G05F 1/40
[52] U.S. Cl. ........................................... 323/272; 323/288
[58] Field of Search .................................... 323/288, 272, 323/268, 282, 284

[56] References Cited

U.S. PATENT DOCUMENTS

| | | | |
|---|---|---|---|
| 4,030,015 | 6/1977 | Herko et al. | 323/288 |
| 5,001,620 | 3/1991 | Smith | 323/285 |
| 5,247,239 | 9/1993 | Yamamura et al. | 323/288 |

*Primary Examiner*—Shawn Riley
*Attorney, Agent, or Firm*—Sawyer Law Group, LLP

[57] ABSTRACT

A parallel power system with over voltage protection is disclosed. The parallel power system comprises at least two voltage regulators in parallel and an over voltage protection circuit for each of the at least two voltage regulators. The over voltage protection circuit comprises a transistor coupled to an associated voltage regulator and a detector coupled to each of the transistor for shutting off power to the associated voltage regulator if the associated voltage regulator is in an over voltage condition. Through the use of a circuit in accordance with the present invention, the computer processors are protected against being damaged as a result of an over-voltage condition in one of the voltage regulators. Moreover, the over voltage protection circuit in accordance with the present invention will isolate the voltage regulator that is experiencing an over voltage condition and shut it down, without shutting down the entire system.

14 Claims, 4 Drawing Sheets

Conventional Over-voltage protection for a parallel system. 10

25 Conv. Voltage Regulator Module (VRM)

100(a) An OVprotection Circuit for parallel power supply system.

PARALLEL POWER SYSTEM WHICH INCLUDES OVER VOLTAGE PROTECTION

FIELD OF THE INVENTION

The present invention relates generally to parallel computer power supply systems and relates specifically to an over voltage protection circuit for a parallel power supply system.

BACKGROUND OF THE INVENTION

Computer systems typically utilize parallel power supply systems. A parallel power supply system generally comprises a plurality of power sources such as DC—DC converters or voltage regulators connected in parallel to provide current to a plurality of processors. FIG. 1a represents a typical parallel power supply configuration 10. This configuration 10 includes an input voltage 12, a fuse 14, a silicon controlled rectifier (SCR) 16, two VRMs 18, 20, a threshold voltage 22, a comparator 23, and a latch 24. FIG. 1b represents a typical VRM configuration 25 which includes first and second capacitors 26, 34, a transistor 28, a diode 30, an inductor 32, an output voltage 36, an error amplifier 37, a pulse width modulator 38, and a reference voltage 39. Typically, these types of parallel power systems do not include isolating diodes or transistors. However, a problem arises in these types of parallel power supply systems when one of the VRMs in parallel initiates an over voltage (OV) condition. When one 5 of the VRMs 18, 20 goes OV, it turns on the SCR 16 which can blow the fuse 14 and cause the entire system to shutdown. For a better understanding of this situation, FIG. 2 is a flowchart of the conventional VRM over-voltage protection scheme. Referring the FIG. 1a and FIG. 2 together, first, the output voltage of one of the VRMs 18, 20 exceeds the threshold voltage 22, via step 40. Next, the output of the latch 24 is driven high by the comparator 23, via step 42. Once the output of latch 24 is driven high, the SCR 16 is turned on, via step 44. Finally, once the SCR 16 is turned on, the fuse 14 will open and clear the fault, via step 46.

This scheme is generally implemented to protect the system against damage. However, the noisy conditions produced by the comparator 22 or an actual over voltage condition generated by VRM 18 or 20 can cause the blowing of the fuse 14. Once this happens, the VRMs will be without input power and the system will be forced to shut down and reboot. For many server and network application systems, this is not a desirable outcome.

Accordingly, what is needed is a circuit that can isolate the particular voltage regulator that is in an over voltage condition and shut it down. Also, the circuit should accomplish this without causing a shutdown of the entire system. The present invention addresses such a need.

SUMMARY OF THE INVENTION

A parallel power system with over voltage protection is disclosed. The parallel power system comprises at least two voltage regulators in parallel and an over voltage protection circuit for each of the at least two voltage regulators. The over voltage protection circuit comprises a transistor coupled to an associated voltage regulator and a detector coupled to each of the transistor for shutting off power to the associated voltage regulator if the associated voltage regulator is in an over voltage condition.

Through the use of a circuit in accordance with the present invention, the computer processors are protected against being damaged as a result of an over-voltage condition in one of the voltage regulators. Moreover, the over voltage protection circuit in accordance with the present invention will isolate the voltage regulator that is experiencing an over voltage condition and shut it down, without shutting down the entire system. This results in a more stable and continuous operating environment.

DETAILED DESCRIPTION

The present invention relates to an over voltage protection circuit for a parallel power system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for an over voltage protection circuit for a parallel processor system. Through the use of a circuit in accordance with the present invention, the computer processors are protected against being damaged as a result of an over voltage condition in one of the voltage regulator modules. Moreover, the over voltage protection circuit in accordance with the present invention will not cause a shut down of the entire system should a voltage regulator experience an over voltage condition. This results in a more stable and continuous operating environment.

Figure 1A:
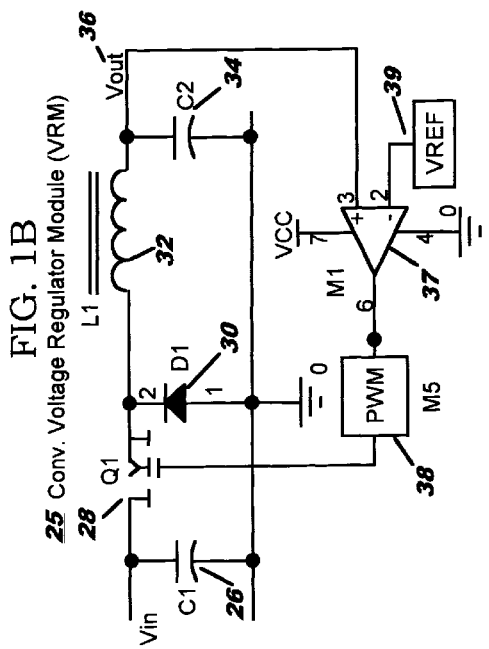
FIG. 1a represents a typical parallel power supply configuration.
Figure 1B:
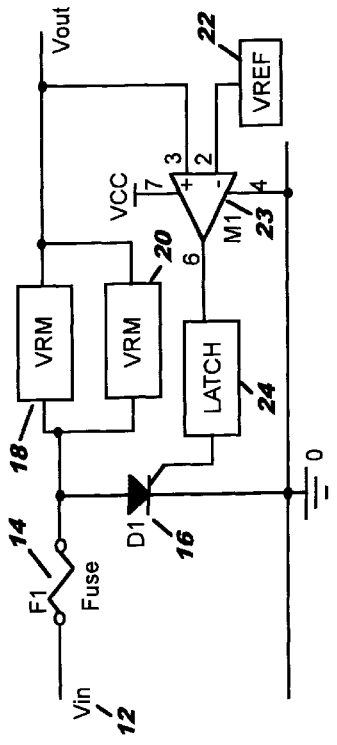
FIG. 1b represents a typical VRM configuration.
Figure 3B:
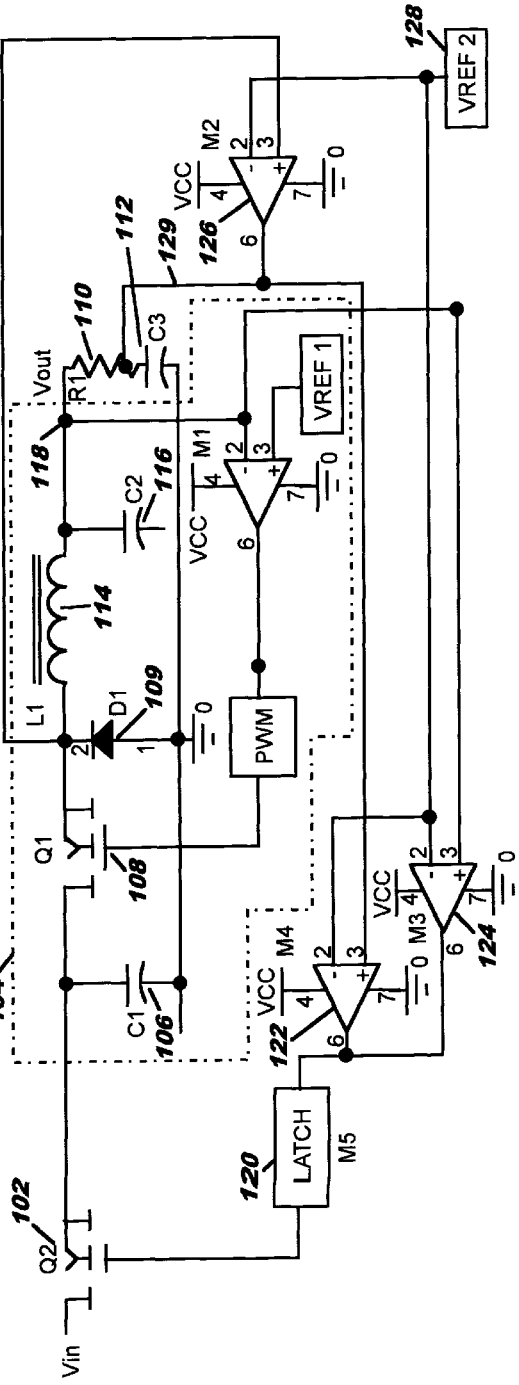
FIG. 3b is a diagram of the over voltage protection circuit for voltage regulator system 100(a).
Figure 2:
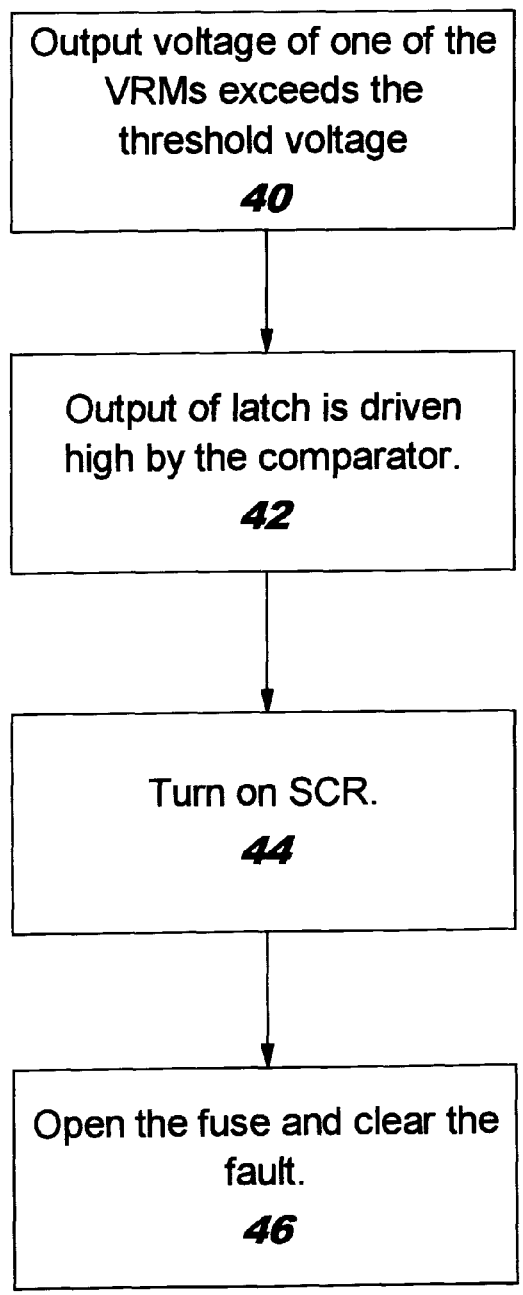
FIG. 2 is a flowchart of a conventional VRM over-voltage protection scheme.
Figure 3A:
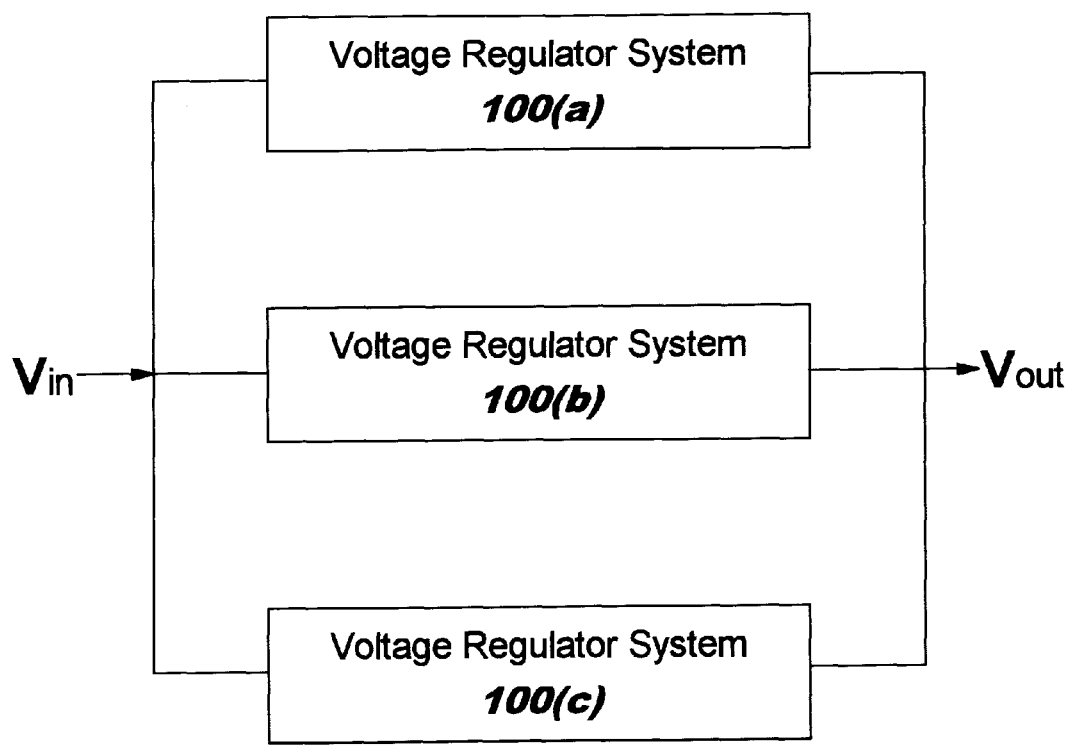
FIG. 3a is a diagram of a parallel power system.

FIG. 3a is a diagram of a parallel power system that includes a plurality of voltage regulator systems 100(a–c). In accordance with the present invention, there is an over voltage protection circuit associated with each voltage regulator system. FIG. 3b is a diagram of the voltage regulator system 100(a) wherein the voltage regulator system 100(a) includes an over voltage protection circuit in accordance with the present invention. The system 100(a) includes a branch protection transistor 102, a VRM portion 104, an output voltage 118, a latch 120, first and second voltage comparators 122, 124, a comparator reset module 126 and a reference voltage source 128. Similar to the conventional VRM, the VRM portion 104 in accordance with the present invention includes first and second capacitors 106, 116, a transistor 108, a diode 109, and an inductor 114. However, the VRM portion 104 also includes a resistor 110 and a third capacitor 112 which are utilized to generate a cycle by cycle ramp voltage 129, which is reset every cycle by the comparator reset module 126.

The first voltage comparator 122 compares the reference voltage 128 and the ramp voltage 129. Preferably, the reference voltage 128 is a predetermined voltage threshold that is based on the type of VRM being utilized. If the ramp voltage exceeds the reference voltage 128 the output from the first voltage comparator 122 to the latch 120 will be high. If not, the output is low. The second voltage comparator 124 compares the reference voltage 128 to the VRM output voltage 118. If the VRM output voltage 118 is higher than the reference voltage 128, the output from the second voltage comparator 124 to the latch 120 will be high. If not, the output is low. However, if the outputs of both voltage comparators 122 and 124 are high, the latch 120 will be set and the branch protection transistor 102 will be turned off, thus removing power from the VRM portion 104.

For example, if the VRM transistor 108 is either shorted or some fault has occurred in the control loop that might keep the transistor 108 on for a longer period than is required for the regulated output, the ramp voltage will exceed the reference voltage 128. If this happens, the output from the first voltage comparator 122 to the latch will be high. However, if the output voltage 118 has not exceeded the reference voltage 128, the output from the second voltage comparator 124 to the latch 120 will be low and the latch 120 will not be set. This is a condition that occurs at start up when the output voltage 118 is low but the ramp voltage exceeds the reference voltage 128.

Figure 4:
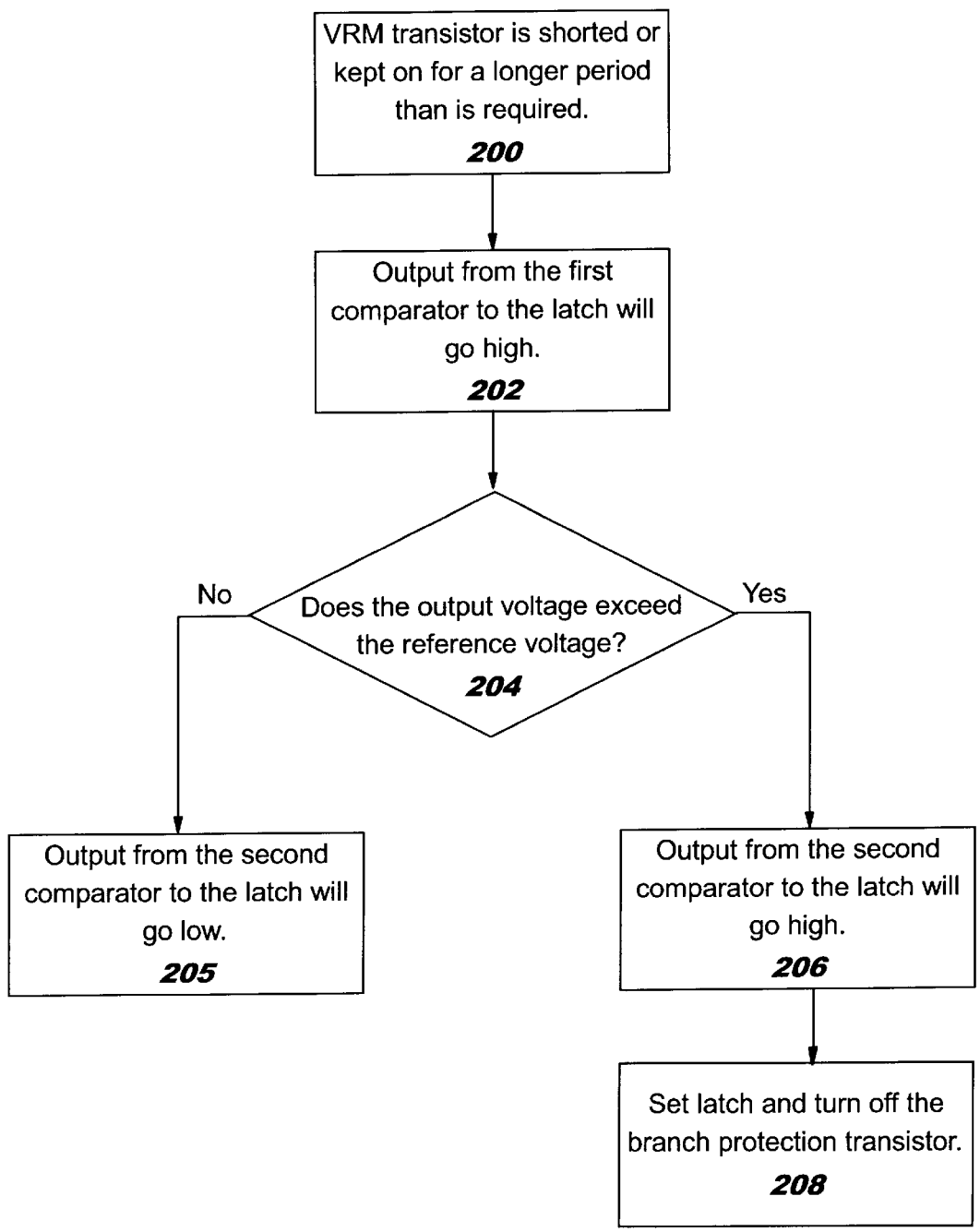
FIG. 4 is a flowchart of the operation of the over voltage protection circuit in accordance with the present invention.

For a better understanding of the operation of the over voltage protection circuit in accordance with the present invention, please refer now to FIG. 3*b* and the flowchart of FIG. 4. First, the VRM transistor is shorted or kept on for a longer period than is required for the regulated output, via step 200. This causes the ramp voltage 129 to exceed the reference voltage 128. Next, the output from the first voltage comparator 122 to the latch 120 will go high, via step 202. It is then determined whether the output voltage 118 exceeds the reference voltage 128, via step 204. If the output voltage 118 does not exceed the reference voltage 128, the output from the second voltage comparator 124 to the latch 120 will stay low, via step 205. This will not cause the latch 120 to be set. However, if the output voltage 118 exceeds the reference voltage 128, the output from the second voltage comparator 124 to the latch 120 will go high, via step 206. The latch 120 will then be set and the branch protection transistor 102 will be turned off, via step 208. Preferably, the branch protection transistor 102 remains off until power to the transistor 102 is removed.

Through the use of a circuit in accordance with the present invention, the computer processors are protected against being damaged as a result of an over voltage condition in one of the voltage regulators. Moreover, the over voltage protection circuit in accordance with the present invention will isolate the voltage regulator that is experiencing an over voltage condition and shut it down, without shutting down the entire system. This results in a more stable and continuous operating environment.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A parallel power system comprising:
   at least two voltage regulators in parallel; and
   an over voltage protection circuit for each of the at least two voltage regulators, the over voltage protection circuit comprising:
   a transistor coupled to an associated voltage regulator; and
   a detector coupled to the transistor for shutting off power to the associated voltage regulator if the associated voltage regulator is in an over voltage condition.

2. The parallel power system of claim 1 wherein each of the at least two voltage regulators produces an output voltage.

3. The parallel power system of claim 2 wherein each of the at least two voltage regulators includes:
   at least one resistor; and
   at least one capacitor coupled to the at least one resistor wherein a ramp voltage is generated by the at least one resistor and the at least one capacitor.

4. The over voltage protection circuit of claim 3 further comprising a first voltage comparator coupled to the detector and to a reference voltage source and to the at least one resistor and the at least one capacitor, the first voltage comparator for comparing the ramp voltage with a reference voltage produced by the reference voltage source.

5. The over voltage protection circuit of claim 4 further comprising a second voltage comparator coupled to the detector, the reference voltage source, and the output voltage, the second voltage comparator for comparing the output voltage with the reference voltage.

6. The over voltage protection circuit of claim 5 wherein the reference voltage is a predetermined threshold voltage.

7. The over voltage protection circuit of claim 6 wherein if the output voltage of the associated voltage regulator and the ramp voltage are higher than the predetermined threshold voltage, the detector turns off the transistor, thereby shutting off power to the associated voltage regulator.

8. A parallel power system comprising:
   at least two voltage regulators in parallel wherein each of the at least voltage regulators includes at least one resistor and at least one capacitor coupled to the at least one resistor wherein the at least one resistor and the at least one capacitor generate a ramp voltage; and
   an over voltage protection circuit for each of the at least two voltage regulators, the over voltage protection circuit comprising:
   a transistor coupled to an associated voltage regulator; and
   a detector coupled to the transistor for shutting off power to the associated voltage regulator if the associated voltage regulator is in an over voltage condition.

9. The parallel power system of claim 8 wherein each of the at least two voltage regulators produces an output voltage.

10. The over voltage protection circuit of claim 9 further comprising a first voltage comparator coupled to the detector and to a reference voltage source and to the at least one resistor and the at least one capacitor, the first voltage comparator for comparing the ramp voltage with a reference voltage produced by the reference voltage source.

11. The over voltage protection circuit of claim 10 further comprising a second voltage comparator coupled to the detector, the reference voltage source, and the output voltage, the second voltage comparator for comparing the output voltage with the reference voltage.

12. The circuit of claim 11 wherein the reference voltage is a predetermined threshold voltage.

13. The circuit of claim 12 wherein if the output voltage of the associated voltage regulator and the ramp voltage are higher than the predetermined threshold voltage, the detector turns off the transistor, thereby shutting off power to the associated voltage regulator.

14. A parallel power system comprising:

at least two voltage regulators in parallel wherein each of the at least two voltage regulators produces an output voltage and each of the at least two voltage regulators includes at least one resistor and at least one capacitor coupled to the at least one resistor wherein a ramp voltage is generated by the at least one resistor and the at least one capacitor; and an over voltage protection circuit for each of the at least two voltage regulators, the over voltage protection circuit comprising:

a transistor coupled to an associated voltage regulator;

a detector coupled to the transistor;

a first voltage comparator coupled to the detector and to a reference voltage source and to the at least one resistor and the at least one capacitor, the first voltage comparator for comparing the ramp voltage with a reference voltage produced by the reference voltage source, the reference voltage being a predetermined threshold value; and a second voltage comparator coupled to the detector, the reference voltage source, and the output voltage, the second voltage comparator for comparing the output voltage with the reference voltage wherein if the output voltage of the associated voltage regulator and the ramp voltage are higher than the predetermined threshold voltage, the detector turns off the transistor, thereby shutting off power to the associated voltage regulator.

* * * * *